UNITED STATES PATENT OFFICE.

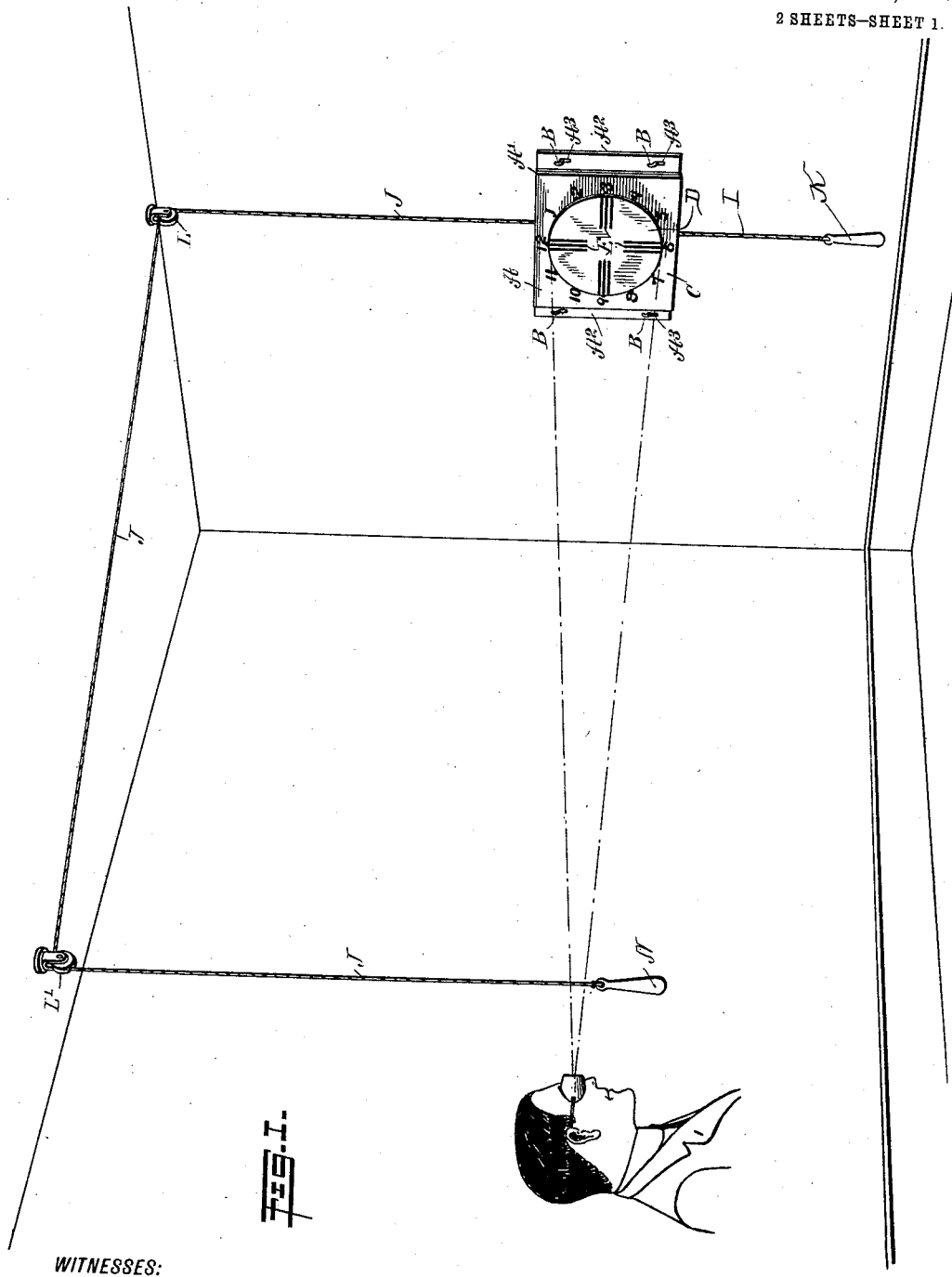

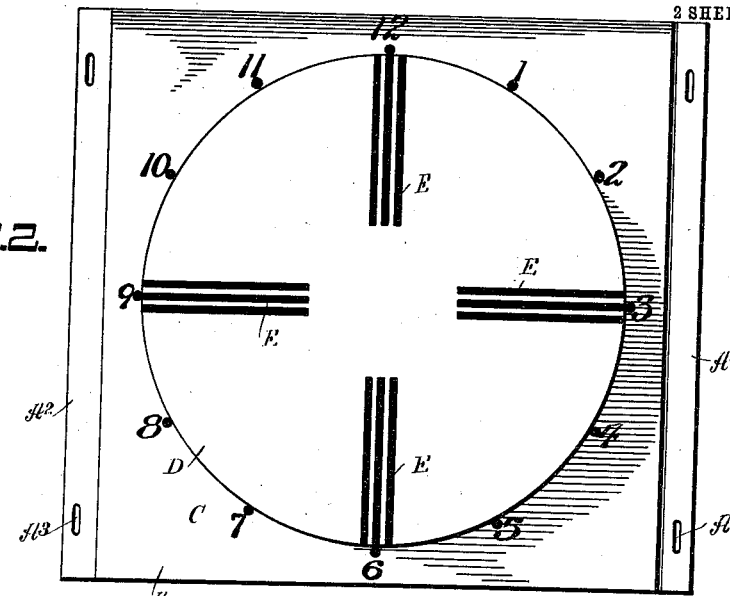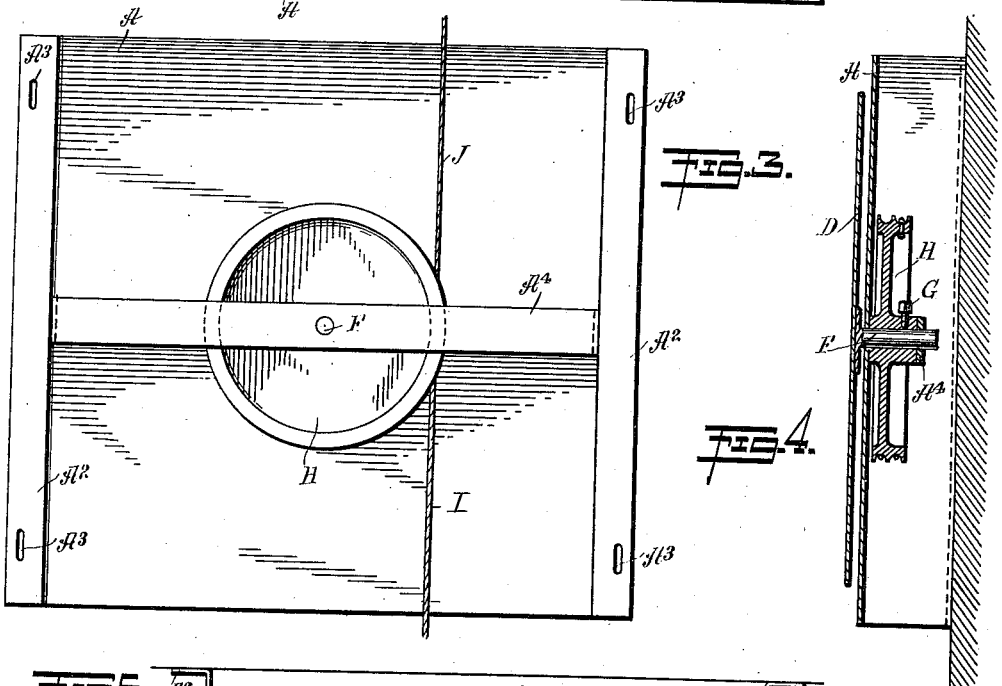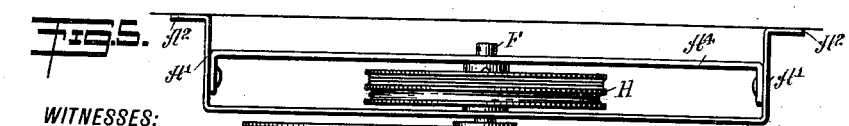

GEORGE OSWALD NICHOLSON, OF LONGBEACH, CALIFORNIA.

ASTIGMATIC CHART.

1,013,428.  Specification of Letters Patent.  Patented Jan. 2, 1912.

Application filed May 19, 1910. Serial No. 562,315.

*To all whom it may concern:*

Be it known that I, GEORGE O. NICHOLSON, a citizen of the United States, and a resident of Longbeach, in the county of Los Angeles and State of California, have invented a new and Improved Astigmatic Chart, of which the following is a full, clear, and exact description.

The object of the invention is to provide a new and improved astigmatic chart, arranged to enable the operator, standing a distance from the chart, to conveniently turn the astigmatic disk to any desired position, the disk having but few astigmatic lines, to insure accurate determination of the patient's vision without danger of confusion.

For the purpose mentioned use is made of a dial arranged for attachment to a wall or other support, and on the face of the dial is arranged a rotary disk having astigmatic lines thereon, adapted to indicate on the scale of the dial, the disk being attached to a shaft journaled on the dial and carrying a double-groove pulley, over which pass cords supporting counterbalancing weights, one of the cords being extended a distance from the chart, to permit the operator to turn the disk from a position adjacent to the patient, thus facilitating the work.

A practical embodiment of the invention is represented in the accompanying drawings forming a part of this specification, in which similar characters of reference indicate corresponding parts in all the views.

Figure 1 is a perspective view of the chart as applied; Fig. 2 is an enlarged face view of the chart; Fig. 3 is a rear face view of the same; Fig. 4 is a transverse section of the same; and Fig. 5 is a plan view of the same.

The dial A, of sheet metal or other suitable material, is provided at the sides with rearwardly-extending flanges A', terminating in outwardly-extending attaching flange $A^2$, provided with openings $A^3$, adapted to engage hooks or like supports B, attached to a wall or the like, for supporting the dial A in a vertical position, as plainly indicated in Fig. 1. The face of the dial A is provided with a circular scale C, preferably running from 1 to 12, in the same manner as the scale of a watch dial, and in front of the dial A is arranged a disk D, the peripheral surface of which extends close to the scale C, and on the face of the disk D are arranged two sets of astigmatic lines E adapted to indicate on the marks of the scale C, at any desired point whenever the disk D is rotated, as hereinafter more fully explained.

The rear face of the disk D is secured on a shaft F, journaled in suitable bearings arranged on the dial A, and a brace $A^4$ connects the side flanges A' with each other, and on the said shaft F in the rear of the dial A, is secured, by a set screw G, a double-groove pulley H engaged by the cords I and J, extending from the pulley H in opposite directions, that is, the cord I extends downwardly and supports at its lower end a counterbalancing weight K, while the cord J extends upwardly and passes over guide pulleys L, L' attached to the ceiling or other support, to lead the terminal of the cord J to a place remote from the dial A, as plainly indicated in Fig. 1. The terminal of the cord J is provided with a counterbalancing weight N, so that normally the disk D is at a standstill.

Now in using the chart, the operator, standing alongside of the patient whose eyes are to be tested, can readily turn the disk D by pulling on the cord J so as to rotate the pulley H and with it the disk D. When the desired position is reached, the operator releases the pull on the cord J, so that the counterbalancing weights K and N again hold the disk in the adjusted position. When the operator lifts the weight N, the disk is turned in an opposite direction owing to the overbalancing pull on the cord I by the weight K. Thus, from the foregoing, it will be seen that the operator can conveniently and accurately turn the disk D while standing near the patient, to bring the astigmatic lines E into the desired position relative to the scale C. It is well known that in correcting the eyes for an error of astigmatism, but two meridians can be corrected, and hence by having but two sets of lines, as shown in Figs. 1 and 2, the operator can bring the said lines into the proper position without confusing the patient, and thus the operator is enabled to quickly and accurately determine the position and degree of the astigmatism.

It is understood that when the patient looks at the two sets of lines E, and the lines appear equally clear to his vision, then the operator rotates the disk D to another meridian, which perhaps will show that the astigmatism is at that angle, the operator then placing a cylinder in the eyeglass frame worn by the patient for the time being, until the lines become equal in sharpness or color, and then the operator can rotate the disk D to all the different meridians to corroborate the work.

The astigmatic chart shown and described, is very simple and durable in construction, and can be readily manipulated by the operator standing at a remote place from the chart.

In the ordinary charts as now generally used, a good many lines are used and hence the patient is liable to become confused on comparing one line with another, while in the present invention only two sets of lines are used at a time, and comparison as to blackness or clearness of the lines is easy and the information obtained from the patient is reliable. The chart can be rotated at will to all the different points of the dial, and as there are only two meridian lines to consider at a time, the entire circle is within range of the lines at all meridians, and the faulty meridian is readily discovered.

Having thus described my invention, I claim as new and desire to secure by Letters Patent:

An astigmatic chart, comprising a stationary dial having at its sides rearwardly extending side flanges bent outwardly and provided with openings for receiving supports in order to sustain said dial in a vertical plane, a brace extending across from one of said flanges to the other, said brace being spaced from said dial and parallel to the same, said dial being provided on its face with an annular scale, an astigmatic disk disposed in front of said dial and provided with meridian lines for registering with said scale, said meridian lines being few in number and extending in two directions relatively to said disk, a shaft carrying said disk and journaled at one of its ends in said dial and at its other end in said brace, a pulley mounted upon said shaft and provided with a plurality of grooves lying in parallel planes, said pulley being disposed between said dial and said brace, cords engaging said pulley and disposed within said grooves, said cords extending in opposite directions from said pulley, counterbalancing weights located upon the ends of said cords, and guides for one of said cords to support the same to a place remote from said dial and said disk.

In testimony whereof I have signed my name to this specification in the presence of two subscribing witnesses.

GEORGE OSWALD NICHOLSON.

Witnesses:
HARLEY E. SMITH,
C. W. SHELBY.

---

Copies of this patent may be obtained for five cents each, by addressing the "Commissioner of Patents, Washington, D. C."